A. F. JENKINS.

PORTABLE TORCH.

APPLICATION FILED APR. 5, 1916.

Reissued Nov. 20, 1917.

14,396.

Witnesses

G. F. Baker.

G. E. Avery.

Inventor

Alexander F. Jenkins by Foster Freeman Watson & Coit

Attorneys

UNITED STATES PATENT OFFICE.

ALEXANDER F. JENKINS, OF BALTIMORE, MARYLAND, ASSIGNOR TO THE ALEXANDER MILBURN COMPANY, OF BALTIMORE, MARYLAND, A CORPORATION OF MARYLAND.

PORTABLE TORCH.

14,396. Specification of Reissued Letters Patent. Reissued Nov. 20, 1917.

Original application filed February 18, 1910, Serial No. 544,624. Divided and application filed November 21, 1912, Serial No. 732,719. Original No. 1,116,822, dated November 10, 1914. Application for reissue filed April 5, 1916. Serial No. 89,238.

*To all whom it may concern:*

Be it known that I, ALEXANDER F. JENKINS, a subject of the King of Great Britain, residing in Baltimore city and State of Maryland, have invented certain new and useful Improvements in Portable Torches, of which the following is a specification.

The present application is a division of application for Letters Patent of the United States, Serial No. 544,624, filed February 18, 1910, which has matured into Patent #1,116,821, dated Nov. 10, 1914.

This invention relates to torches of the portable type adapted to be carried by firemen in rescue work, the device being so designed that it can be conveniently carried by the fireman in making his way through dark rooms and passages, especially in the case of dwellings and other buildings burning at night. This portable torch, however, may be used by builders and others where a strong light is needed for working at night or in the dark.

The invention has for its object to provide a novel gas discharge pipe that leads out of a suitable tank and is composed of hingedly connected sections whereby the burner on the end of the pipe can be adjusted to throw the rays in any desired direction.

With this object in view and others, as will appear as the description proceeds, the invention comprises the various novel features of construction and arrangement of parts which will be more fully described hereinafter and set forth with particularity in the claims appended hereto.

In the accompanying drawings, which illustrate one embodiment of the invention,

Similar reference characters are employed to designate corresponding parts in the views.

Figure 2:
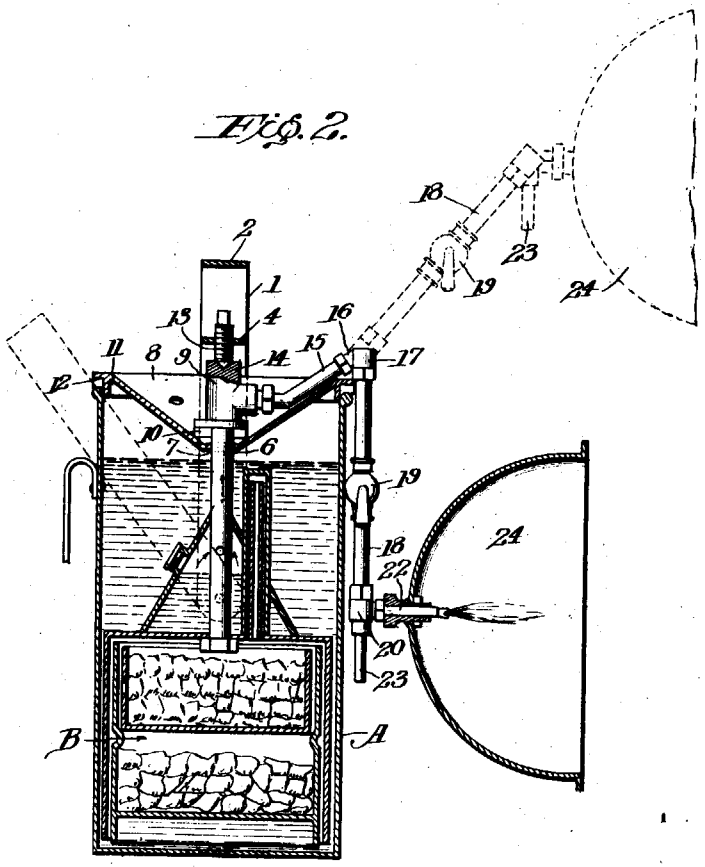
Fig. 2 is a vertical section thereof.
Figure 1:
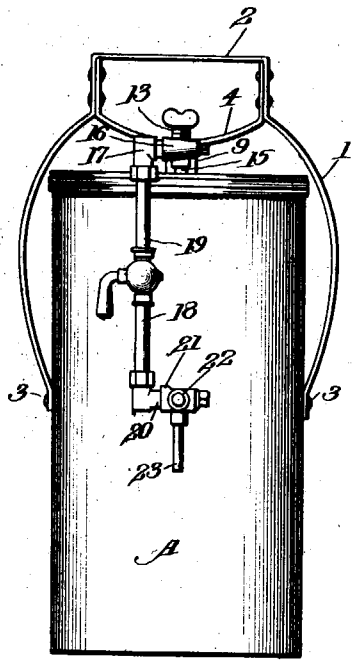
Figure 1 is a front view of the apparatus.

Referring to the drawing, A designates a water-containing tank that is open at its top to permit of the insertion and removal of an acetylene generator designated generally by B. The tank is provided with a bail 1 consisting of side members connected by a top cross piece 2 that forms a handle and hinged at their lower ends 3 on the tank at diametrically opposite points, and secured to the side members, at a point under the handle 2, is a cross bar 4 spaced from the handle so that the fingers can be passed between them in taking hold of the handle. On the rear side of the tank is a hook 5, whereby the device can be attached to a support when the user does not wish to carry it.

The construction and operation of the generator B need not be described herein, as it is fully set forth in the parent application. Arising from the generator is a gas outlet pipe 6 which extends through an opening 7 in the cover 8 of the tank, where the pipe is provided with an elbow 9, there being a washer or gasket 10 disposed between the bottom of the coupling 9 and cover 8 to seal the opening 7. The cover has an internal flange 11 that fits within the tank and under the cover is a packing ring 12 that forms a water seal.

The cover is clamped in closed position and the generator held down by the bail of the tank, there being a screw 13 on the cross bar 4 of the bail which engages in a socket or seat 14 provided on the top of the coupling 9. By tightening the screw, the pipe 6, together with the generator, is forced downwardly and as the result, the packings 10 and 12 are compressed so that leakage of water is prevented, should the apparatus be accidentally knocked over. The cover 8 is preferably dished inwardly so as to form a funnel, whereby the water can be readily supplied to the tank after the generator has been inserted, it being merely necessary to loosen the screw 13 and raise the generator by lifting the coupling 9 to remove the washer 10 from the cover 8, and by doing this the water poured into the funnel-shaped cover is free to pass through the opening 7 into the tank. Since the bail is pivoted on the tank, it can be swung to one side to permit the cover, together with the generator, to be lifted out of the tank.

The gas-conducting pipe at the outside of the tank is preferably made of hingedly connected sections, so that the flame can be moved to any desired position. Attached to the coupling 9 is a short fixed pipe section 15 that terminates at the edge of the tank and is provided with a socket coupling 16 in which is mounted a pivot coupling 17. Attached to this coupling 17 is a section 18, having a controlling cock 19. On the extremity of the pipe section 18 is a pivot coupling 20 on which is arranged a socket coupling 21 that carries a burner jet 22 and also a handle 23 whereby the coupling 21 can be turned about a horizontal axis to change the direction of light rays from the burner. On the burner tube 22 is supported a parabolic reflector 24 for concentrating the rays on any given point. The pipe section 18 can be swung about the coupling 16 as a center through one hundred and eighty degrees from a position in front of the tank to a position wholly above the latter, whereby the device can be set to suit different conditions. Furthermore, the generator and the whole gas conduit can be turned as a unit about the axis of the generator for directing the flame to different points in a horizontal plane, this movement being limited by the pipe sections 15 striking the members of the bail, and this adjustment is desirable when the device is supported by the hook 5, and the flame is required to be directed on a given point to either side. The swinging section 18 is of such length that when it is in the vertical pendent position shown, the reflector will not touch the floor and interfere with the tank resting flat on its bottom.

From the foregoing description, taken in connection with the accompanying drawings, the advantages of the construction and operation of the invention will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims.

Having described the invention what is claimed is:

1. A torch comprising a gas supply tank adapted to be carried by hand, a conduit extending through the upper end of the tank and provided outside of the tank with a lateral branch, a section of pipe connected with the outer end of said branch conduit by a joint permitting the free end of the pipe to be positioned close to a vertical wall of the tank or at a considerable distance from said wall and above the horizontal plane of the top of the tank, and a burner on said free end.

2. A torch comprising a portable gas supply tank, a gas outlet pipe extending above the tank, a burner supporting pipe jointed to said outlet pipe and constructed and arranged to extend above the tank or to fold down parallel and close to the wall of the tank, and a burner adjustably mounted on the free end of said supporting pipe, said burner being adjustable to assume different positions and to coöperate with the joint of said supporting pipe to allow the said pipe to be folded down alongside the tank.

3. A portable torch comprising a gas supply tank, a gas-conducting pipe connected with the tank and rising therefrom and having a portion extending laterally to the side of the tank, a swinging pipe hingedly connected to the outer end of said portion, and a burner on the swinging pipe, said swinging pipe normally occupying a pendent position close to the side of the tank and capable of swinging to an upright position.

4. A hand-carried generator and torch comprising a tank, a generator therein, a gas-conducting pipe connected with the generator and rising therefrom and having a portion extending laterally to the side of the tank, a swinging pipe hingedly connected to the outer end of the said portion, and a burner on the swinging pipe, said swinging pipe normally occupying a pendent position close to the side of the tank and capable of swinging to an upright position.

5. The combination of a tank, a cover therefor, means in the tank for generating gas, a laterally-extending pipe above the cover, a gas-conducting connection between the pipe and gas-generating means within the tank, a hinge coupling at the outer end of the pipe, a pipe connected with the hinge coupling and movable from a pendent position close to the side of the tank to an upright position, and a burner on the free end of the second-mentioned pipe.

6. The combination of a tank, a cover therefor, means in the tank for generating gas, a laterally-extending pipe above the cover, a gas-conducting connection between the pipe and gas-generating means within the tank, a hinge coupling at the outer end of the pipe, a pipe connected with the hinge coupling and movable from a pendant position close to the side of the tank to an upright position, a burner on the free end of the second-mentioned pipe, and a reflector attached to the burner, said second-mentioned pipe being of such length that the bottom of the reflector is disposed above the level of the bottom of the tank when the second pipe is in pendent position.

7. The combination of a tank, a generator therein, a gas-conducting pipe extending centrally of the tank and connected with the generator, a second pipe connected with the first and extending laterally therefrom to the side of the tank, and a swinging burner carrying pipe hingedly connected with the outer end of the second pipe and movable from a pendent position at the side of the tank to an upright position above the tank.

8. The combination of a tank, a generator therein, a gas-conducting pipe extending centrally of the tank and connected with the generator, a second pipe connected with the first and extending laterally therefrom to the side of the tank, a swinging burner-carrying pipe hingedly connected with the outer end of the second pipe and movable from a pendant position at the side of the tank to an upright position above the tank, a burner hingedly connected with the said swinging pipe, a reflector on the burner, and a handle connected with the burner for moving the same to direct the rays of light in different directions.

In testimony whereof I affix my signature.

ALEXANDER F. JENKINS.

Copies of this patent may be obtained for five cents each, by addressing the "Commissioner of Patents, Washington, D. C."